US010220594B2

(12) United States Patent
Dill et al.

(10) Patent No.: US 10,220,594 B2
(45) Date of Patent: Mar. 5, 2019

(54) HYDROPHOBIC FIBERGLASS THERMAL INSULATION MATERIALS

(71) Applicants: Lewis Dill, Baton Rouge, LA (US); Chengjun Zhou, Baton Rouge, LA (US)

(72) Inventors: Lewis Dill, Baton Rouge, LA (US); Chengjun Zhou, Baton Rouge, LA (US)

(*) Notice: Subject to any disclaimer, the term of this patent is extended or adjusted under 35 U.S.C. 154(b) by 39 days.

(21) Appl. No.: 15/653,606

(22) Filed: Jul. 19, 2017

(65) Prior Publication Data

US 2018/0022059 A1  Jan. 25, 2018

Related U.S. Application Data

(60) Provisional application No. 62/364,532, filed on Jul. 20, 2016, provisional application No. 62/405,557, (Continued)

(51) Int. Cl.
*B32B 5/06* (2006.01)
*B32B 5/30* (2006.01)
(Continued)

(52) U.S. Cl.
CPC ............... *B32B 5/06* (2013.01); *B32B 5/24* (2013.01); *B32B 5/30* (2013.01); *B32B 15/14* (2013.01);
(Continued)

(58) Field of Classification Search
CPC .... D01F 6/00; D06N 7/00; B32B 5/00; B32B 15/00; B32B 2307/50
See application file for complete search history.

(56) References Cited

U.S. PATENT DOCUMENTS 3,838,082 A * 9/1974 Sauer ................... B01D 39/086
428/422
4,376,674 A * 3/1983 Ali ....................... D21H 5/0002
106/18.12
(Continued)

OTHER PUBLICATIONS

High Temperature Insulation Textiles & Accessories for Industry, Lewco, 2000.*
(Continued)

*Primary Examiner* — Gordon Baldwin
*Assistant Examiner* — Mohammad Mayy
(74) *Attorney, Agent, or Firm* — Buskop Law Group, P.C.; Wendy Buskop

(57) ABSTRACT

Hydrophobic thermal insulation fiberglass flexible blanket using a textile grade fiberglass is produced by impregnating a hydrophobic polymer (e.g. a fluoropolymer) dispersion into a fiberglass blanket/mat, such as a needle felted fiberglass (FG) blanket/mat. The preferred FG needle felt blanket is a mechanically, rather than organically, bound glass fiber insulating blanket. The hydrophobic polymer dispersion forms a hydrophobic coating on the surface of the fiberglass filaments. Integral hydrophobicity is achieved and maintained without the need to add commonly-used hydrophobic inorganic particles, such as treated silica aerogels or fumed silica. Optionally, to enhance overall hydrophobicity and to inhibit fibrous surface lofting, a super-hydrophobic coating of fluoropolymer and inorganic particles such as silica particles may be dispersed onto one or more surfaces of the blanket. The resulting blanket thermally insulates better than mineral wool; it is equal in insulating properties to (or is slightly better than) untreated FG mat; and it slightly less insulating than aerogel-based blanket materials. It is relatively inexpensive to manufacture, it is flexible, it is durable, it can optionally be made moldable, it eliminates dust, and
(Continued)

it remains hydrophobic after long-term heating to 600° F. (315° C.), or after short-term excursions to temperatures as high as 700° F. (370° C.).

12 Claims, 1 Drawing Sheet

Related U.S. Application Data filed on Oct. 7, 2016, provisional application No. 62/512,385, filed on May 30, 2017.

(51) Int. Cl.

| | | |
|---|---|---|
| *B32B 5/24* | (2006.01) | |
| *B32B 15/14* | (2006.01) | |
| *B32B 27/08* | (2006.01) | |
| *D06N 7/00* | (2006.01) | |
| *D01F 6/12* | (2006.01) | |
| *D06N 3/00* | (2006.01) | |
| *D06N 3/04* | (2006.01) | |
| *D06N 3/18* | (2006.01) | |

(52) U.S. Cl.
CPC .............. *B32B 27/08* (2013.01); *D01F 6/12* (2013.01); *D06N 3/0022* (2013.01); *D06N 3/0081* (2013.01); *D06N 3/047* (2013.01); *D06N 7/0094* (2013.01); *B32B 2307/50* (2013.01); *D06N 3/009* (2013.01); *D06N 3/0063* (2013.01); *D06N 3/0068* (2013.01); *D06N 3/183* (2013.01); *D06N 2201/082* (2013.01); *D06N 2203/044* (2013.01); *D06N 2205/02* (2013.01); *D06N 2205/10* (2013.01); *D06N 2207/123* (2013.01); *D06N 2209/065* (2013.01); *D06N 2209/142* (2013.01); *D06N 2213/02* (2013.01); *D06N 2213/03* (2013.01)

(56) References Cited

U.S. PATENT DOCUMENTS

| | | | | |
|---|---|---|---|---|
| 4,515,656 A | * | 5/1985 | Memeger, Jr. | ........ D21F 11/006 162/101 |
| 4,923,547 A | * | 5/1990 | Yamaji | ..................... D04H 1/60 156/181 |
| 5,334,648 A | * | 8/1994 | Drews | ..................... C03C 25/34 428/147 |
| 8,568,563 B1 | | 10/2013 | Bennett | ......................... 162/145 |
| 2001/0030023 A1 | * | 10/2001 | Tippett | .................... B32B 27/12 156/333 |
| 2004/0109986 A1 | * | 6/2004 | Keese | ..................... A47J 36/02 428/167 |
| 2005/0084742 A1 | * | 4/2005 | Angelopoulos | ..... H01M 8/0202 429/432 |
| 2006/0078719 A1 | | 4/2006 | Miele | ........................ 428/292.1 |
| 2007/0134488 A1 | * | 6/2007 | Hayakawa | .............. A47J 36/02 428/323 |
| 2007/0231576 A1 | * | 10/2007 | Davis | ..................... B32B 27/36 428/412 |
| 2011/0070789 A1 | | 3/2011 | Kalb et al. | ......................... 442/1 |
| 2013/0337250 A1 | * | 12/2013 | Austin | ....................... C09J 7/29 428/219 |

OTHER PUBLICATIONS

"Comparative Properties of Hydrophilic and Hydrophobic Fumed Silica Filled Two-Component Polyurethane Adhesives", M. A. Bahattab, V. Garcia-Pacios, J. Donate-Robles, and J. M. Martin-Martinez, Journal of Adhesion Science and Technology 26 (2012) 303-315.*

Dill, L., "The Right Stuff: Material Considerations," Insulation Outlook, pp. 1-5 (2004).

Thermablok Aerogel Blanket, "Thermablok Aerogel Insulation Blanket," datasheet, (date unknown).

Warren Controls, "Thermiguard™ SS D 0713 Submittal Sheet," (unknown date).

Basu, B. et al., "Fabrication of Superhydrophobic Nanocomposite Coatings Using Polytetrafluoroethylene and Silica Nanoparticles," International Scholarly Research Network Nanotechnology, vol. 2011, Article ID 803910. Web. Aug. 14, 2017.

Ge, D. et al., "Hydrophobic and Thermal Insulation Properties of Silica Aerogel/Epoxy Composite," Journal of Non-Crystalline Solids, vol. 355, pp. 2610-2615 (2009).

* cited by examiner

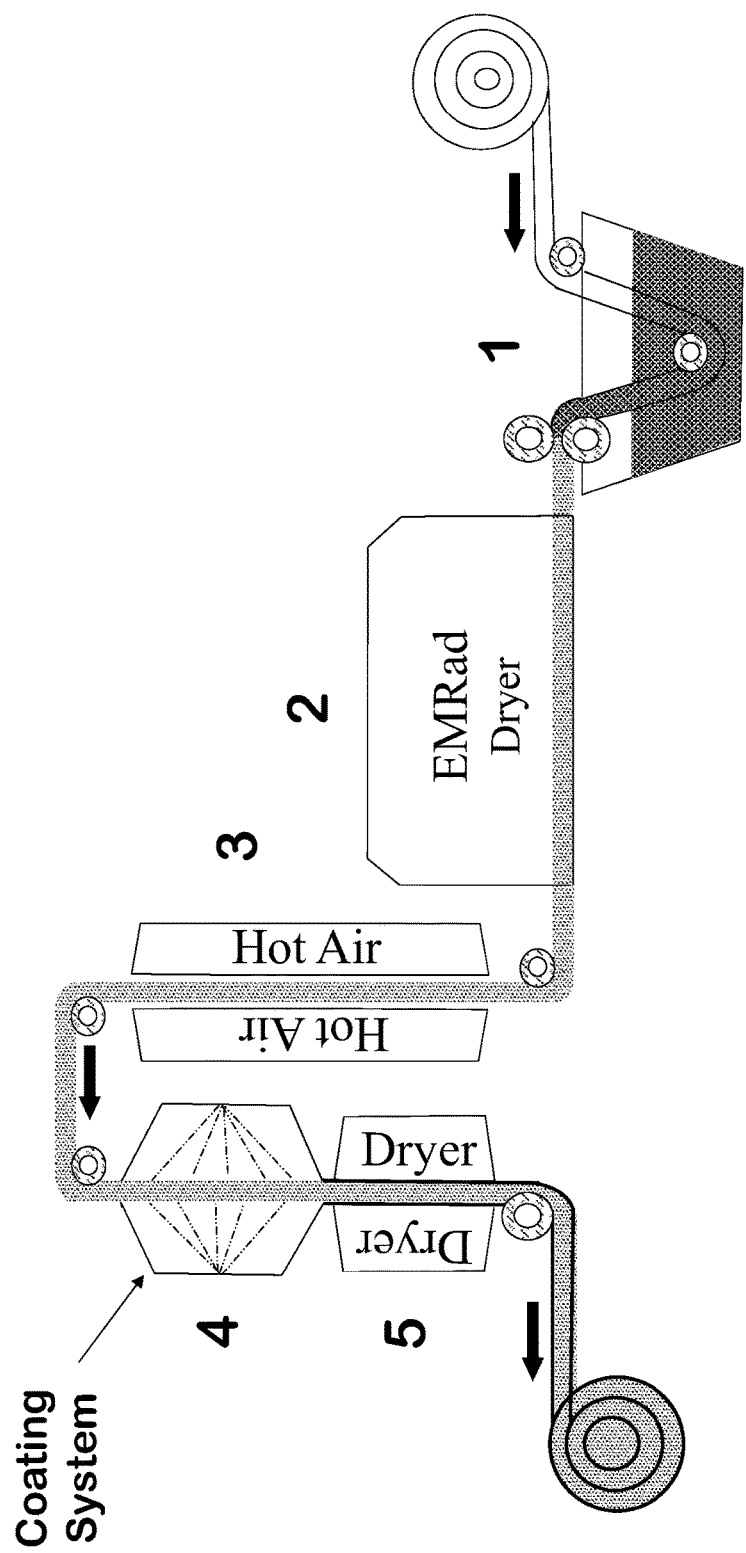

HYDROPHOBIC FIBERGLASS THERMAL INSULATION MATERIALS

The benefit of the 20 Jul. 2016 filing date of U.S. provisional patent application Ser. No. 62/364,532; and of the 7 Oct. 2016 filing date of U.S. provisional patent application Ser. No. 62/405,557; and of the 30 May 2017 filing date of U.S. provisional patent application Ser. No. 62/512,385 are claimed under 35 U.S.C. § 119(e) in the United States, and are claimed under applicable treaties and conventions in all countries.

TECHNICAL FIELD

The invention pertains to hydrophobic blankets useful for providing thermal insulation.

BACKGROUND ART

Blanket-type thermal insulation is frequently used for commercial and industrial applications that require personnel protection or thermal insulation. Such blankets are typically flexible, removable, and reusable to a greater or lesser degree. A drawback of most commonly-used insulation blankets is that they are prone to absorbing and holding moisture when exposed to a moisture source, whether in indoor or outdoor environments. Retention of moisture is undesirable because wet blankets lose much of their thermal insulation ability, they become heavier, and they can sag. The ingress and accumulation of water not only affect the insulating properties of the blanket, and the position of the blanket relative to the object being insulated, but can potentially lead to under-insulation-induced corrosion or moisture-induced corrosion on the insulated equipment, which can affect safety and system life.

There is an unfilled need for improved, economical, hydrophobic thermal insulation materials with improved long-term thermal performance, and resistance to corrosion when used in high-temperature, humid environments.

Several types of insulation blankets are currently available commercially, including those made from mineral wool, aerogels, fiberglass, and microporous insulation. Some of these materials address or partially address water intrusion and absorption by employing a water repellent (hydrophobic) treatment. However, hydrophobicity in high temperature (>400° F., 205° C.) blanket materials is rare. In most cases, hydrophobicity decays over time or upon exposure to temperatures in excess of 300° F. (150° C.), creating thermal inefficiency, personnel safety risk, and corrosion issues.

Water inside an insulation material compromises insulation characteristics, regardless of the type of insulation material. Water inside insulation is also a key factor in the corrosion of covered metallic equipment.

Mineral wools and fiberglass wools can hold large amounts of water after they have been submerged in water, or even without submersion after extended exposure to water vapor/steam. Hydrophobic wools, blankets, boards, or roll materials (example: Johns Manville MinWool-1200) can be treated with a water-repelling agent such as a liquid silicone emulsion or like, which can be integrated into the product during processing or sprayed onto its surface. These agents typically have a limited life expectancy, depending on service conditions. They may or may not pass initial ("as new") accepted industry standards for hydrophobicity (e.g. ASTM C 1511-15).

A microporous insulation blanket/panel is a high-temperature, thin, flexible, blanket insulator incorporating hydrophobic, fumed silica particles to attain hydrophobicity to 600° F. (315° C.). Examples are Johns Manville InsulThin™ HT and Microtherm® Quilted Panels. A disadvantage of these materials is that they generate substantial amounts of dust during product application and fabrication. Dust can also be released from these products when the hydrophobic woven E-glass cloth outer envelope is cut or damaged.

Commercially-available aerogel blanket products generally meet the hydrophobicity requirements of ASTM C 1511. However, aerogel blankets often have excess caking resulting from their processing. Caked, excess aerogel material left on the surface can generate dust during handling and application. This nuisance dust can cause applicators to incur added fabrication, installation, and application precautions, with attendant increased expense. With both microporous insulation and aerogel blankets, the generation of dust is difficult to avoid, and is a major inconvenience for operators working with or in the vicinity of such materials.

Thermiguard™ SS D 0713 Submittal Sheet (unknown date) discloses thermal blankets in which the insulation material is a fiberglass needled mat type E fiber mat, encapsulated by PTFE-impregnated fiberglass cloth.

L. Dill, "The Right Stuff: Material Considerations," *Insulation Outlook* (June 2004) describes various high-temperature insulation blankets, including some made from a fiberglass felt core insulation with a silicone- or PTFE-impregnated fiberglass fabric exterior for waterproofing.

U.S. patent application publication no. 2011/0070789 discloses a laminate material with layers combined into an insulating barrier blanket. The insulating barrier blanket comprises a high-temperature, abrasive and puncture resistant outer shell, a thermal insulation core, and an interior protective layer. The outer shell is preferentially made of a hydrophobic or oleophobic fabric layer, such as organic polyamide fibers or PTFE-laminated fiberglass.

Thermablock Aerogel Insulation Blanket (unknown date) is a data sheet for a commercially available product, describing a silica aerogel insulation blanket said to be vapor-permeable, but nonhygroscopic offering no transport for liquid.

There is an unfilled need for an insulation material that is hydrophobic to temperatures of 600° F. (315° C.) for long-term use (or higher temperatures during short excursions), that does not produce dust during installation and use, and that is more economical than existing insulators.

DISCLOSURE OF THE INVENTION

We have discovered a hydrophobic fiberglass blanket that can be used for thermal insulation, and a method for its cost-efficient manufacture. The hydrophobic fiberglass blanket produces little or no dust or other shedding during production, handling, and application. The blanket demonstrates excellent hydrophobicity to 600° F. (315° C.) for long term use, with very good thermal insulation, comparable to that of dry, but hydrophilic (conventional) glass fiber blankets of otherwise similar needle felt construction. Unlike conventional glass fiber blankets, which readily absorb water, the novel blankets are highly hydrophobic.

The invention fills the need for an economical thermal insulation system with excellent insulating properties, one that can interface between external ambient temperatures and internal operation temperatures up to 600° F. (315° C.) for long-term use, or up to 700° F. (370° C.) for short-term excursions. The system has excellent hydrophobicity, and does not rely on a hydrophobic inorganic powder component (e.g., an aerogel) that generates excessive dust.

The invention's insulating properties are based on limiting free air movement, as is true for most types of commercial insulation. Maintaining excellent long-term performance characteristics—thermal insulation and corrosion mitigation (which can be assessed, for example, per ASTM C795)—is based on keeping a dry environment both in the blanket itself and on the surface of the covered substrate. Previous insulation materials have either not performed this task well, or they have been overly expensive and tend to produce excessive dust. The novel materials limit corrosion while providing excellent thermal performance, at a cost less than that of existing materials, and without generating significant amounts of dust.

The novel material is a thermal insulator whose thermal conductivity properties lie roughly between those of an aerogel blanket, and of 4 lb density mineral wool board.

The novel insulation blanket meets or exceeds the water absorption requirements of ASTM C1511, the industry standard for Determining the Water Retention (Repellency) Characteristics of Fibrous Glass Insulation. Per the ASTM C 1511 test protocol (which is the same as that used to assess commercial aerogel blanket insulators), samples of the novel blanket have been submerged 5 inch (13 cm) below the surface of water for 15 min. The novel blanket absorbed less water than five percent of its own weight. The samples were then heated to 600° F. (315° C.) for 24 hours. ASTM C1511 testing was repeated, and again there was less than five percent water absorption by mass.

Preliminary tests showed good permeability to water vapor, better than that of aerogel-based materials.

In one embodiment, an improved hydrophobic insulation blanket is provided that comprises an inorganic, textile-grade glass fiber structured blanket/mat, and a hydrophobic polymer coating. Optional components include: an opacifier, and a relatively smaller quantity of hydrophobic-coated inorganic particles incorporated as a topcoat. The flexible insulation blanket has excellent hydrophobic properties during continuous long-term use to 600° F. (315° C.), or to 700° F. (370° C.) for short excursions, without the production of substantial amounts of dust during manufacturing, installation, or use.

Properties of the novel insulation blanket include: a) low thermal conductivity, b) ease of manufacture and application, c) no generation of substantial amounts of dust, d) ease of cutting and fabrication, e) optional moldability. The novel insulation blankets are especially suited for high temperature uses (100° F. (40° C.) and above), for example in hydrocarbon processing, oil and gas production and refining, chemical production, aerospace applications, appliances, marine, and automotive applications. The novel blankets can easily be processed into finished insulation parts, for example by compression molding or die cutting. They are ideal for OEM-specific applications requiring a combination of moldability, hydrophobicity, and high thermal insulation efficiency.

The novel blanket can optionally be made moldable by a suitable choice of components, and moldable embodiments can then readily be shaped/molded in secondary processing. These embodiments can, for example, be processed into finished insulation parts using otherwise conventional methods such as compression molding and die cutting. Moldable compositions are ideal for OEM applications requiring moldability, hydrobicity, and thermal insulation up to 600° F. (315° C.).

The novel insulation blanket material remains both insulating and hydrophobic at higher temperatures than do existing aerogel products. Although aerogel-based blankets can remain insulating at 600° F. (315° C.), the hydrophobic components of existing aerogel-based blankets decompose at that temperature, rendering the aerogel product much more hydrophilic. By contrast, the novel product remains both thermally insulating and hydrophobic up to 600° F. (315° C.) for long-term use, with short-term excursions allowed to even higher temperatures.

The thermal insulation composite contains a textile-grade glass fiber insulating core, typically in the form of a blanket. The blanket is impregnated with a hydrophobic polymer, and optionally an opacifier. The glass fibers/filaments are coated with a dispersion of a hydrophobic polymer, typically a fluoropolymer, using a dispersion of a type otherwise known in the art. The fiberglass preferably has a needle-felt construction, but other forms of fiberglass may also be used. A fiberglass needle felt is produced from yarn by opening up a textile-grade fiberglass yarn into its constituent fibers, and stitching the fibers together with a needle loom, to make a felt blanket that is held together mechanically, rather than with an adhesive.

A preferred process for forming the novel blanket includes: (a) forming a dispersion of a hydrophobic polymer in a solvent with a surfactant (e.g., a dispersion of a fluoropolymer such as polytetrafluoroethylene), optionally also including an opacifier; (b) repeatedly dipping and nipping the needle-felted blanket into the fluoropolymer dispersion to form a homogeneously wetted blanket; (c) evaporating water/solvent from the wet blanket by application of intense electromagnetic radiation (EMRad) to leave behind the hydrophobic polymer properly distributed throughout the blanket, including its interior; (d) decomposing hydrophilic residues remaining from the former dispersion and from the original fiberglass material, by heated air flow through the blanket (typical hydrophilic residues thus removed can include, for example, sizing (starches) from the processed fiberglass, and surfactants from the fluoropolymer dispersion formulation), (e) spraying or otherwise coating an additional hydrophobic layer onto one or more outer surfaces of the blanket to make the material super-hydrophobic, (f) drying the surface coating, typically by conventional surface heating methods. Cut edges typically are not further coated, although optionally they could be.

Surprisingly, we discovered that the method used to evaporate water/solvent from the wet blanket (step (c) in the description of the prior paragraph) is very important. Conventional drying techniques such as forced-air drying, convection heating, radiant heating, and infrared heating were found to be unsuitable, and to lead to inferior products. When these other heating methods were employed, most of the hydrophobic polymer evidently migrated to the surface of the blanket, which left the interior of the blanket relatively devoid of hydrophobic polymer, and rendered the interior susceptible to absorbing water. Although these other drying techniques may be appropriate for other processes, such as coating relatively thin woven fabrics with fluoropolymers, we discovered, quite surprisingly, that they worked poorly with thicker blankets such as fiberglass needle felts, thicker than about 0.25 inch (6 mm). Surprisingly, we discovered that the manner of drying in step (c) is highly significant. In particular, we discovered that drying by electromagnetic radiation (EMRad), preferably radio frequency or microwave radiation, unlike other drying techniques, leaves the hydrophobic polymer more evenly dispersed throughout the fiberglass blanket, and results in a product with superior hydrophobicity following solvent evaporation. However, EMRad drying alone is generally not sufficient to remove all water/solvent efficiently; thus the EMRad drying step should be followed by a further drying step, such as forcing hot air through the EMRad-dried blanket. Provided that most of the solvent has previously been evaporated by the EMRad step, a further drying/heating step by a different means does not result in maldistribution of the hydrophobic polymer.

To achieve the required hydrophobic character, residual hydrophilic components should be removed—e.g., sizing (starch) coating on the fiberglass, and surfactant derived from the fluoropolymer dispersion. This decomposition and removal is conveniently accomplished by the second heating step, typically with forced air at 400° F. to 650° F. (205° C. to 345° C.).

BRIEF DESCRIPTION OF THE DRAWING

The FIGURE illustrates one embodiment of a manufacturing process for producing the hydrophobic insulation blanket.

MODES FOR CARRYING OUT THE INVENTION

In one embodiment, a hydrophobic insulation blanket in accordance with the present invention contains the following ingredients at the indicated proportions, based on percentage by mass of the finished blanket:

| Component | Range (%) | Preferred Range (%) |
|---|---|---|
| Glass fiber | 60-95 | 80-90 |
| Hydrophobic polymer | 2-30 | 5-25 |
| Hydrophobic inorganic particle | 0-10 | 0-5 |
| Opacifier | 0-10 | 0-5 |

The textile-grade glass fiber may, for example, be E-glass fiber, C-glass fiber, ECR-glass fiber, S-glass fiber, high $SiO_2$ percentage fiber, or blends of these fibers, long enough and strong enough to create a durable, needle-felted blanket. The blanket is preferably a needle-felted, textile-grade fiberglass blanket having a density in the range of 4 to 15 lb/ft$^3$ (65 to 250 g/L), more preferably in the range of 6 to 12 lb/ft$^3$ (100 to 200 g/L). The glass fiber preferably has a minimum temperature rating of at least 1200° F. (650° C.), and more preferably up to 1800° F. (980° C.). The diameter of the glass fibers is a matter of choice, and may for example be in the range of 4 to 13 microns, preferably in the range of 6 to 11 microns. Fiber length is also a matter of choice, provided that the fibers are long enough and strong enough to create a durable, needle-felted blanket; the fiber length may for example be between 0.2 to 6 inches (0.5 to 15 cm), and is preferably 2 to 5 inches (5 to 13 cm).

Alternatively, a needle felted blanket manufactured from basalt-based, textile-grade fibers otherwise known in the art could be used in practicing the invention. Again, the basalt-derived fibers should be long enough and strong enough to create a durable, needle-felted blanket.

The hydrophobic polymer is preferably a fluoropolymer. Preferably, the hydrophobic polymer is temperature-stable at least up to 600° F. (315° C.). The fluoropolymer may be applied as a water-based or organic solvent-based dispersion. Examples of hydrophobic polymers that can be used in the present invention include, but are not limited to, polytetrafluoroethylene (PTFE), perfluoroalkoxy alkanes (PFA), fluorinated ethylene propylene (FEP), and blends of these polymers.

The product can be made moldable by employing a mixture of fluoropolymers with substantially different melting points. For example, including a fraction of a lower melting point fluoropolymer, such as FEP or PFA with a melting point below 600° F. (315° C.), in a composition containing a larger fraction of a higher-melting polymer, can enhance overall moldability. The low-melting fluoropolymer is between 0.1% and 90% of the total fluoropolymer by mass, and is between 0.1% and 25% of the finished blanket by mass.

An optional but preferred embodiment uses a hydrophobic inorganic filler combined with a fluoropolymer dispersion, to form a super-hydrophobic top coat on one or more outer faces of the blanket, which has otherwise been produced as described above. Examples of hydrophobic inorganic fillers that can be used in such an outer coating include, but are not limited to, silica aerogel, fumed silica, precipitated silica, micron size synthetic amorphous silica, and other fumed oxides—in each case, surface-treated to render the materials hydrophobic. A preferred hydrophobic inorganic particulate material is a silica aerogel or fumed silica that has been surface-modified with one or more alkylsilyl groups, such as with dimethyl silyl or trimethylsilyl groups, to make the particles water-resistant. The surface area of the hydrophobic inorganic particulate material can be greater than 100 m$^2$/g, preferably greater than 150 m$^2$/g. The particle size of the hydrophobic inorganic particulate material can be in the range of 0.1 to 100 microns, preferably in the range of 0.5 to 50 microns.

An infrared opacifier is optionally included to reduce radiative contributions to thermal conduction, especially at higher temperatures. Examples of opacifiers include, but are not limited to, carbon black, graphite, graphene, titanium dioxide ($TiO_2$), iron oxides (e.g., $Fe_2O_3$ or $Fe_3O_4$), silicon carbide (SiC), zirconium dioxide, and their mixtures. The particle size of the optional opacifier can be in the range of 0.1 to 100 microns, preferably 1 to 20 microns.

Preferred Process of Making Hydrophobic Blanket:

In one embodiment a wet fiberglass blanket is impregnated with a hydrophobic fluoropolymer dispersion in water, and the wetted blanket is initially dried by EMRad heating, specifically radio frequency (RF) or microwave heating, followed by a second heating step using forced hot air. Other methods of heating have also been tested (particularly for the initial drying step), but other heating methods produced quite unsatisfactory results, apparently because they induced (or allowed) migration of fluoropolymer to the outer surface of the fiberglass, leaving the inner portion largely uncoated and far more susceptible to absorbing water. Surprisingly, the use of EMRad (radio frequency or microwave) heating—unlike the other heating methods—resulted in a uniform polymer distribution throughout the blanket, without significant migration of the fluoropolymer, rendering the entire thickness of the blanket hydrophobic. EMRad also has the benefits of rapid drying time, fast production/manufacturing line speeds, compatibility with a continuous processing mode, consistent final moisture levels, and lower drying temperatures as compared to common radiant or convection heating methods.

One embodiment of a process for making the novel blankets is illustrated schematically in the FIGURE. In the FIGURE the identifying numerals refer both to the steps of the embodied process, and to the apparatus for carrying out the corresponding step:

(Step 1) Needle-felted fiber glass blankets of a chosen density are dipped/submerged into a wetting tank containing a fluoropolymer dispersion. (Fluoropolymer dispersions in water, or water-alcohol mixed solvents are well-known in the art.) The wetted blanket is nipped (or compressed) to reach a target wet weight, preferably an increase of 50%-200% over the weight of the raw dry blanket. The dipping and nipping step may optionally be repeated as necessary to achieve uniform wetting at the desired density. (Step 2) The wetted, nipped blanket is then transferred to an EMRad drying oven, where the bulk of the solvent is evaporated. The percentage of solvent evaporated at this stage should be at least 50%, preferably at least 70%, and most preferably at least 90%. (Step 3) The EMRad-dried blanket is then transferred to high-temperature, hot air flow-through drying equipment for further drying/evaporation of solvent, and also for the thermal decomposition and removal of residual hydrophilic compounds, such as glass fiber sizing (starch), and the surfactants that had previously been used to emulsify the fluoropolymer. The temperature of the heated air in this step 3 is in the range 400° F. to 650° F. (205° C. to 345° C.), preferably 500° F. to 600° F. (260° C. to 315° C.). (Above 630° F. (330° C.), PTFE sinters (melts), which is undesirable in this process.) The hot air flow-through drying is rapid and economical. (Step 4) The blanket is then optionally, but preferably, given a super-hydrophobic top coat on one or more surfaces, where the top coating comprises a film of a fluoropolymer dispersion that further contains hydrophobic inorganic particles (e.g., hydrophobic silica coated with a fluoropolymer). This coating is preferably applied to the top and bottom surfaces of the blankets. Cut edges are generally not coated, although they could be. (A surface is considered "super-hydrophobic" when its contact angle with a water droplet is greater than 150°. Such measurements may be made, for example, in accordance with ASTM D7334.) (Step 5) The coated surfaces are impingement-dried in a convection oven at a temperature of 400 to 650° F. (205° C. to 345° C.).

Fluoropolymer Dispersion.

The fluoropolymer dispersion comprises solvent, one or more fluoropolymers, an optional opacifier, and a surfactant. The preferred solvent is polar, and is preferably a mixture of water and a low molecular weight alcohol. The percentage of alcohol in the mixture can be in the range of 0 to 99 vol %, preferably 5 to 90 vol %. Alcohols that can be used include, but are not limited to, methanol, ethanol, and isopropanol. The concentration of hydrophobic fluoropolymer in the dispersion can be in the range of 0.1 to 60 wt %, preferably 1 to 20 wt %. The concentration of surfactant can be in the range of 0.1 to 10 wt %, preferably 1 to 8 wt %. Commercial fluoropolymer dispersions are typically sold with surfactants already incorporated; it will generally suffice to use such mixtures as provided by the manufacturer without the need to add a further surfactant.

Dispersion Topcoat:

The optional but preferred surface coating dispersion comprises a hydrophobic polymer (preferably the same hydrophobic polymer used in soaking the blanket), IR opacifier, hydrophobic inorganic particles, and a suitable wetting agent. The wetting agent can be a surfactant having a low boiling point. Typical wetting agents can be anionic or nonionic surfactants. A preferred wetting agent is capable of volatilizing or decomposing, so that it can be removed during the drying step to restore the hydrophobicity of the hydrophobic polymer. (Any residual wetting agent remaining on the surface of the particles could reduce hydrophobicity of the blanket.) Removal of the wetting agent can be by volatilization, with or without decomposition. Wetting agents (surfactants) that can be used include, but are not limited to, the various ether amine oxides and ethoxylated alcohols known in the art. The concentration of hydrophobic polymer particles in the dispersion can be in the range of 0.1 to 30 wt %, preferably 1 to 15 wt %. The concentration of hydrophobic inorganic particles can be in the range of 0 to 10 wt %, preferably in the range of 0 to 5 wt %. The concentration of the wetting agent (surfactant) in the dispersion can be in the range of 0.01 to 10 wt %, preferably 0.1 to 5 wt %. The concentration of opacifier can be in the range of 0 to 10 wt %, preferably 0 to 5 wt %.

The hydrophobic textile-grade fiberglass blanket of the present invention can be used for a variety of purposes, including use as a thermal insulating material for process equipment, pipe or pipeline energy conservation, process control reliability, upstream oil recovery, pipe-in-pipe applications, insulation for aircraft, insulation for automobiles and trucks, insulation for marine craft, building insulation, aerospace insulation, clothing insulation, footwear insulation, and the like. The present invention can be used in nearly all applications where aerogel insulation blankets are currently used, as well as in applications where aerogels are not generally used due to their cost or because they generate dust. Blankets in accordance with the present invention can, however, be manufactured much thicker than can aerogel blankets. Aerogel blankets are typically 4 to 15 mm thick, although it might be possible to custom-manufacture thicker aerogel blankets for specific purposes. To date, mats in accordance with the present invention have been prepared in thicknesses up to 1.25 inches (32 mm), based primarily on the thickness of the rolled "raw" fiberglass blankets as originally received from the manufacturer. The preparation of thicker mats in accordance with the present invention is expected to be straightforward, using thicker "raw" fiberglass blankets as starting materials, although to date thicker blankets have not yet been tested.

Further details and explanation of the present invention may be found in the following examples, which are given by way of illustration and not limitation:

EXAMPLES

Example 1

A hydrophobic insulation blanket was made from fiberglass needle blanket and PTFE. A uniform dispersion for impregnation (first dispersion) was made in a 1-quart (1 L) container by adding 0.1 lb (45 g) of PTFE particles in a surfactant dispersion (Laurel AD-10, Laurel Products, LLC., Elverson, Pa.) with 0.5 lb (225 mL) of water, and agitating at 750 rpm for about 10 min.

Lewco fiberglass needle felts (Lewco Specialty Products Inc., Baton Rouge, La.) with a density of 10 lb/ft$^3$ (0.15 kg/L) and a thickness of 0.5 inch (1.3 cm) were completely dipped/soaked in the PTFE dispersion. The soaked blankets were immediately nipped/pressurized (i.e., pressure-squeezed between rollers) to reach a total wet weight of 2.0 times the weight of the raw dry blankets, and the blankets were then transferred to a microwave oven for 15 to 60 min. The mass of water lost in the microwave oven was about 90 wt %. The blankets were then transferred to forced hot air (laboratory) drying equipment for drying at 550° F. (290° C.).

This example was conducted on a laboratory scale. On an industrial scale, the blankets will be moved by conveyor belt through the various process steps, as shown schematically in the FIGURE.

The blanket was then surface-coated with a second dispersion. The second dispersion was made in a 1-quart (1 L) container by adding 0.1 lb (45 g) of PTFE particles in a surfactant dispersion (Laurel AD-10, Laurel Products, LLC) with 0.5 lb (225 mL) of water; 0.01 lb (4.5 g) of silica aerogel that had been surface-modified with trimethyl groups, average particle size of about 10 μm, (JIOS AeroVa® Aerogel, JIOS Aerogel Corporation, Gyeonggi-do, Korea); and 0.01 lb (4.5 g) of Surfynol TG (Air Products and Chemicals, Inc., Allentown, Pa.) surfactant; and agitating at 1500 rpm for about 10 min. The dispersion was applied by spraying onto both the top and bottom surfaces of the blanket. The blanket was then dried in an impingement convection oven at about 550° F. (290° C.) for approximately 4 min. Alternatively, one could use infrared drying, or a combination of impingement convection and infrared drying.

The resulting blanket was very flexible. The thermal conductivity of the finished product was measured according to the procedures of ASTM C177. The thermal conductivity (k value, Btu·in/hr·ft$^2$·° F.) at different temperatures is shown in Table 1. Surprisingly, the PTFE actually improved the thermal insulation properties of the needled bond fiberglass blanket, albeit slightly. This result was unexpected, because PTFE's thermal insulation properties are inferior to those of needled bond fiberglass blanket, and therefore inferior thermal properties would have been expected by incorporating PTFE.

TABLE 1

Thermal conductivity (k) of hydrophobic fiberglass blanket (HFB) and untreated fiberglass needle felts (FNF), determined per ASTM C177.

| (Imperial Units). | | | | | | |
|---|---|---|---|---|---|---|
| Temperature (° F.) | 75 | 300 | 500 | 700 | 900 | 1050 |
| k (Btu · in/hr · ft$^2$ · ° F.) HFB | 0.26 | 0.37 | 0.47 | 0.62 | 0.95 | 1.18 |
| FNF | 0.26 | 0.36 | 0.49 | 0.65 | | |

| (Metric Units). | | | | | | |
|---|---|---|---|---|---|---|
| Temperature (° C.) | 24 | 149 | 260 | 371 | 482 | 566 |
| k (Watt/m · ° K) HFB | 0.037 | 0.053 | 0.070 | 0.09 | 0.137 | 0.170 |
| FNF | 0.037 | 0.052 | 0.070 | 0.094 | | |

The water absorption of the finished product was measured according to ASTM C 1511 to be less than 5 wt % (per the results of testing by an independent laboratory; our own tests had showed water absorption between 1.5 wt % and 3.2 wt %).

Example 2

Historically, this Example 2 (which was unsuccessful) actually preceded Example 1 (which was successful). Example 2 can be used (in hindsight) to illustrate the effect that the manner of solvent evaporation has on the hydrophobicity of the produced blanket, as shown in Table 2. The procedures were largely the same as Example 1—with the principal exception that no EMRad oven was used. Water was instead evaporated from the wetted blanket with a traditional, convection oven. The blanket produced in this manner absorbed more than 5 wt % water, and thus did not satisfy the ASTM C 1511 test protocol. Conventional oven heating evidently resulted in a maldistribution of the PTFE dispersion in the produced blankets. Most of the PTFE apparently migrated to the (outer) surfaces of the blanket, leaving the center of the blanket largely devoid of hydrophobic components—meaning that the center readily absorbed water. By contrast, the blanket produced by EMRad drying (Example 1) had a much more uniform distribution of hydrophobic polymer, and this blanket absorbed less than 5 wt % water. In Table 2, Samples 1 and 2 were from Example 2; and Samples 3 and 4 were from Example 1:

TABLE 2

Effect of manner of solvent evaporation from the wet blankets.

| Sample | Drying method | Oven temperature | Water absorption |
|---|---|---|---|
| 1 | Conventional oven | 590° F. (310° C.) | 8.3 wt %[†] |
| 2 | Conventional oven | 630° F. (330° C.) | 10.2 wt %[†] |
| 3 | Microwave | N/A | 3.1 wt % |
| 4 | Radio frequency | N/A | 2.9 wt % |

[†]These two values are higher than the values we had originally measured, 6.2% and 7.6%. The higher values in the later measurements reported in Table 2 resulted from retesting, using materials with cut edges. The higher water absorption by cut edges reflects the practical problem that cut edges increase the potential for a hydrophilic interior to be exposed to water, and to absorb water.

Example 3

Procedures were the same as in Example 1, except that blankets were made from fiberglass needle felts of differing densities and thicknesses. This Example examined the effect of the density and thickness of the raw blanket on the hydrophobicity of the produced blanket. Water absorption by the resulting blankets is summarized in Table 3, in which the reported values were measured in accordance with ASTM C 1511. All samples met the ASTM C 1511 standard of absorbing less than 5 wt % water, meaning that all were effective as hydrophobic fiberglass insulating blankets.

TABLE 3

Effect of density and thickness of hydrophobic fiberglass needle felts.

| Sample | Density | Thickness | Water absorption |
|---|---|---|---|
| 1 | 7 lb/ft$^3$ (110 g/L) | 0.3 in (8 mm) | 3.7 wt % |
| 2 | 7 lb/ft$^3$ (110 g/L) | 0.5 in (13 mm) | 2.9 wt % |
| 3 | 10 lb/ft$^3$ (160 g/L) | 0.5 in (13 mm) | 2.8 wt % |
| 4 | 10 lb/ft$^3$ (160 g/L) | 0.6 in (15 mm) | 3.3 wt % |
| 5 | 10 lb/ft$^3$ (160 g/L) | 0.8 in (20 mm) | 2.0 wt % |
| 6 | 12 lb/ft$^3$ (190 g/L) | 0.9 in (23 mm) | 1.7 wt % |

These data showed that the final hydrophobicity of a processed blanket was largely independent of its density or thickness.

Example 4

Procedures were the same as in Example 1, except that blankets were made with a different concentration of hydrophobic fluoropolymer in the dispersion. This Example examined the effect that the hydrophobic fluoropolymer concentration in the dispersion had on the hydrophobicity of the produced blanket. The water absorption of the resulting blankets is summarized in Table 4.

TABLE 4

Effect of concentration of hydrophobic fluoropolymer in the dispersion.

| Sample | PTFE concentration in the dispersion | Water absorption |
|---|---|---|
| 1 | 20 wt % | 4.0 wt % |
| 2 | 10 wt % | 2.8 wt % |
| 3 | 7 wt % | 3.0 wt % |
| 4 | 5 wt % | 3.2 wt % |

The results in Table 4 indicated that the PTFE concentration (over the range 5 wt % to 20 wt %) in the dispersion did not strongly affect the water absorption properties of the finished blanket, albeit there was some variation. All samples tested met the criteria of ASTM C 1511. In other results (not shown), 40% PTFE loading resulted in higher water absorption than did lower levels of PTFE. Likewise, 10% gave better results than 20%. The lower water absorption at lower levels of PTFE was quite surprising. The 10% level is considered optimal, and is less expensive than higher loadings. Even at 5% the water absorption is still quite low, although it was not as good as at 10%. Also, lower levels of PTFE had slightly lower thermal conductivity than higher levels, perhaps because there is less mass to conduct heat.

Example 5

Procedures were the same as in Example 1, except that the blankets had different wet weights after the dipping/nipping cycles. This Example examined the effect of the loading concentration of hydrophobic fluoropolymer on the hydrophobicity of the produced blanket. The higher the weight of the wet blanket, the greater was the loading of the hydrophobic fluoropolymer in the produced blanket. After drying, the produced blankets were tested per ASTM C1511. The water absorptions of the blankets are summarized in Table 5. All samples met the ASTM C 1511 standard, i.e., the fluoropolymer loading levels used in this series of experiments (between 8 wt % to 14 wt %) were effective in making hydrophobic fiberglass insulating blankets.

TABLE 5

Effect of weight of wet blanket after repeated dipping/nipping on water absorption by the finished blankets, per ASTM C1511.

| Sample | Increased weight of wet blanket | Fluoropolymer weight in final dry blanket | Water absorption of finished blanket |
|---|---|---|---|
| 1 | 55% | 8.0% | 2.9 wt % |
| 2 | 73% | 9.5% | 4.0 wt % |
| 3 | 97% | 11.5% | 3.0 wt % |
| 4 | 119% | 13.2% | 3.2 wt % |
| 5 | 125% | 13.7% | 2.0 wt % |

Example 6

Procedures were the same as in Example 1, except that different percentages of solvent were removed from the wet blankets by EMRad drying. This Example examined the effect of the degree of solvent removal by the initial EMRad drying step on the hydrophobicity of the produced blanket. The observations showed that the more solvent that was removed from the wet blanket by EMRad drying, the more uniform appeared to be the distribution of hydrophobic fluoropolymer throughout the blanket. The water absorption per ASTM C1511 for the resulting blankets is summarized in Table 6. All samples except Sample 1 met the ASTM C 1511 standard. Based on these observations, we concluded that it is preferred to remove 70% or more of the solvent by EMRad; and that, within the limits of what is practical and economical in a particular setting, it is preferred to remove as much solvent as reasonably feasible in the initial EMRad drying step.

TABLE 6

Effect of degree of solvent removal by EMRad drying on water absorption of finished blanket.

| Sample | Weight loss of solvent by EMRad drying | Water absorption per ASTM C1511 standard |
|---|---|---|
| 1 | 53% | 6.0 wt % |
| 2 | 76% | 4.3 wt % |
| 3 | 88% | 3.7 wt % |
| 4 | 92% | 2.8 wt % |

Example 7

Procedures were the same as in Example 1, except that the blankets were prepared with various topcoats. This Example examined the effect of the composition of the top coat on the hydrophobicity of the produced blanket. The water absorptions of the resulting blankets are summarized in Table 7. Samples without a top coat, or with a 100% PTFE top coat had greater than 5% water retention, while samples with a top coat containing one of various hydrophobic inorganic particles and PTFE had less than 5% water retention. Applying a top coat with a combination of a hydrophobic inorganic particle and PTFE 15 preferred, as it produces super-hydrophobic surface performance; water adhesion on the surface of the blankets is drastically reduced. The wettability of a solid surface is determined by the chemical composition and geometrical structure ("roughness") of the surface. Without wishing to be bound by this hypothesis, the inventors believe that the inorganic particles impart multi-scale roughness to the blanket surface; and the hydrophobic polymer provides high contact angles for water droplets; the result of the combination being a low overall roll-off angle for water on the surface.

TABLE 7

Effect of the composition of the top coat.

| Samples | Composition of top coat | Water retention |
|---|---|---|
| 1 | No top coat | 10.0 wt % |
| 2 | 100% PTFE | 6.0 wt % |
| 3 | 90% PTFE + 10% aerogel | 2.7 wt % |
| 4 | 90% PTFE + 10% fumed silica | 4.0 wt % |
| 5 | 90% PTFE + 10% precipitated silica | 4.9 wt % |
| 6 | 80% PTFE + 20% precipitated silica | 2.3 wt % |

Example 8

Procedures were the same as in Example 1, except that after the topcoat had been applied, the resulting blanket was heated for 24 hours at 550° F. (290° C.) with an impingement convection oven. The resulting blanket satisfied the ASTM C 1511 standard, and was super-hydrophobic.

(Likely the heating could also be carried out for a shorter time and still produce a super-hydrophobic blanket; the heating time will be optimized in future testing.) The resulting blanket was then further aged for 24 hours at 600° F. (315° C.), 650° F. (345° C.), or 700° F. (370° C.). This Example examined the effect of aging for 24 hours at various temperatures on the hydrophobicity of the produced blanket. Results are shown in Table 8. The results indicated that all aged samples met ASTM C 1511, and that the blankets remained hydrophobic at least up to an aging temperature 700° F. (370° C.) for a short-term (24-hour) exposure.

TABLE 8

Effect of 24 hour-aging temperature on water retention.

| Sample | Temperature | Water Retention |
|---|---|---|
| 1 | 600° F. (315° C.) | 2.5 wt % |
| 2 | 650° F. (345° C.) | 3.2 wt % |
| 3 | 700° F. (370° C.) | 4.5 wt % |

Example 9

Samples of the novel insulation blanket were tested by an independent, certified laboratory using the test criteria of ASTM C177 (Standard Test Method for Steady-State Heat Flux Measurements and Thermal Transmission Properties by Means of the Guarded-Hot-Plate Apparatus). Results of the independent testing are given in Table 9. Included in Table 9 for comparison are published thermal conductivity measurements for other, commercially available insulation materials. The results indicated that at or below 700° F. (370° C.), the novel hydrophobic fiberglass blanket had better thermal insulation properties than do most commercially available insulation materials, except for the aerogel blankets and microporous silica blankets. Aerogel blankets have slightly better insulation properties; however aerogel blankets are more expensive, and they tend to generate unwanted dust during installation and use.

TABLE 9

Thermal Conductivity of the novel hydrophobic fiberglass (E glass) blanket (HFB); an in situ sol-gel-formed aerogel blanket (AG); expanded perlite block (EP); calcium silicate block (CS); and mineral wool (MW).

| (Imperial units). Thermal Conductivity, k, BTU-in/hr-ft²-° F. | | | | | |
|---|---|---|---|---|---|
| Temperature (° F.) | HFB* | AG** | MW** | CS** | EP** |
| 75 | 0.26 | 0.16 | 0.24 | 0.41 | 0.48 |
| 300 | 0.37 | 0.21 | 0.36 | 0.50 | 0.59 |
| 500 | 0.47 | 0.28 | 0.53 | 0.60 | 0.69 |
| 700 | 0.62 | 0.39 | 0.75 | 0.71 | 0.80 |
| 900 | 0.95 | 0.50 | | | |
| 1050 | 1.18 | 0.62 | | | |

| (Metric units). Thermal Conductivity, k, W/m-° K | | | | | |
|---|---|---|---|---|---|
| Temperature (° C.) | HFB* | AG** | MW** | CS** | EP** |
| 24 | 0.037 | 0.023 | 0.034 | 0.059 | 0.069 |
| 149 | 0.053 | 0.030 | 0.052 | 0.072 | 0.085 |
| 260 | 0.067 | 0.040 | 0.076 | 0.086 | 0.099 |
| 370 | 0.09 | 0.056 | 0.108 | 0.102 | 0.115 |
| 482 | 0.137 | 0.072 | | | |
| 566 | 0.170 | 0.089 | | | |

*Thermal conductivity results per ASTM C 177, testing by an independent third party laboratory.
**Thermal conductivity figures from industry-supplied data (e.g. insulation thickness calculators, manufacturer's data sheet, or other reference sources)

Example 10

Moldable hydrophobic insulation blankets were made from fiberglass needle blanket, PTFE, and fluorinated ethylene propylene (FEP); or from fiberglass needle blanket, PTFE, and perfluoroalkoxy alkanes (PFA); in each case, with a super-hydrophobic topcoat. Procedures were the same as in Example 1, except that the blankets were made from PTFE, PFA, FEP, or mixtures. A super-hydrophobic topcoat was applied in all cases. The produced blankets were tested for water absorption per ASTM C1511. The results are summarized in Table 10.

TABLE 10

Effect of composition.

| Sample | PTFE | PFA | FEP | Water absorption |
|---|---|---|---|---|
| 1 | 10 wt % | 0 | 0 | 3.0 wt % |
| 2 | 10 wt % | 0 | 10 wt % | 3.6 wt % |
| 3 | 10 wt % | 10 wt % | 0 | 3.9 wt % |

Examples 11-14

Samples of the blankets were hot-compressed in a mold, followed by cooling down. "Moldability" was assessed by processing or pressing a blanket into a desired shape, such as a tube or a pan. Blankets were wrapped around a metal tube, heated to 600° F. (315° C.) for 15 min, and cooled to room temperature. The shapes of three molded samples are shown in a photograph that may be viewed in the disclosure of priority application 62/512,385 (but that is not reproduced here). Samples 2 and 3 were found to have a stable shape, indicating that the addition of PFA or FEP to PTFE increased the moldability of the blankets. Sample 1 did not retain its shape as well as did the other two.

A blanket having the same composition as sample 2 was also molded into a pan shape. Two household metal kitchen baking pans were used as the molds, each 4"×10"×6" (10 cm×25 cm×15 cm), one pan as the inside mold and one pan as the outside mold. The molds with blanket were heated to 600° F. (315° C.) for 20 min, and cooled to room temperature. The forms were then removed, and the material was trimmed to 4"×10"×2".

The shape of blanket was altered by the molding step, and the altered shape was maintained thereafter. Accelerated aging tests were carried out by placing molded pans of different formulations in a 600° F. (315° C.) oven for 30 minutes. The same samples, before and after heating at 600° F. (315° C.), are shown in photographs that may be viewed in the disclosure of priority application 62/512,385 (but that are not reproduced here). The pans made from Samples 2 and 3 were stable following the accelerated heating test, indicating that the addition of PFA or FEP to PTFE increased the moldability of the blankets. Sample 1, PTFE only, did not retain its shape as well as did the others. Samples 2 and 3 were weighted with a steel plate for 30 minutes after heating and cooling. The steel was 12 inches×6 inches×0.25 inches (25 cm×12 cm×0.6 cm). Both the FEP- and PFA-containing formulations held their shape after cooling, even after the application of the additional weight.

In another test a moldable blanket formulated from sample 2, Table 10 was shaped into a rectangular bowl or pan. One inch of water was poured into the molded blanket bowl, and allowed to stand for three months. Additional water was added from time to time to compensate for evaporation, to maintain the depth of the water at about one inch throughout the test. No water leaked, at least through the end of the three-month trial. The insulation blanket was thus demonstrated to be both moldable and hydrophobic. This rectangular bowl is shown in a photograph that may be viewed in the disclosure of priority application 62/512,385 (but that is not reproduced here).

Definitions

For purposes of this specification and the claims, "hydrophobic," "hydrophobicity," and like terms, when used in reference to a composite material, mean that the material will, when submerged 5 inches (13 cm) below the surface of deionized water for 15 minutes at 25° C. and 1 atmosphere ambient air pressure, absorb five percent (5.0%) or less of its own mass in water. Further, a "hydrophobic" material will not meaningfully dissolve, decompose, disintegrate, or lose structural integrity when submerged in water under these conditions.

When used in reference to an individual subcomponent, or in reference to a microscopic composite (e.g. a surface-modified aerogel particle), rather than to a macroscopic composite as a whole, the term "hydrophobic" is not given any special definition herein, and instead the word "hydrophobic" in those contexts should be understood as it would normally be understood by persons of ordinary skill in the art.

For purposes of this specification and the claims, the term "composite" and like terms refer to an engineered, solid-phase material made from two or more constituent materials having significantly different physical or chemical properties, in which the constituents remain separate and distinct on a macroscopic level within the finished, solid-phase structure. The engineered materials produced in the Examples described herein, containing fiber glass, polymers, and optionally other components, are examples of "composite" materials.

For purposes of the specification and claims, when a process is described as comprising certain "sequential" steps, the designation "sequential" indicates that the listed steps are performed in the order described. For a continuous process, one in which different process steps are carried out simultaneously on different portions of a fiberglass blanket as the blanket is pulled or transported through a series of stations on a process line or assembly line, the steps are considered to be "sequential" for purposes of the specification and claims if the steps are carried out in the designated order with respect to a small portion of the fiberglass blanket as the small portion traverses the series of stations on the line; notwithstanding that some or all steps may be occurring on other portions of the blanket simultaneously.

A "thermal insulator" is a material with a thermal conductivity, k, less than 1.00 BTU-in/hr-ft$^2$-° F. (0.14 Watt/m° K) for at least some temperatures between 75° F. and 700° F.

Miscellaneous

The complete disclosure of our U.S. provisional application 62/364,532, filed 20 Jul. 2016 is hereby incorporated by reference in its entirety. The complete disclosure of our U.S. provisional application 62/405,557, filed 7 Oct. 2016 is hereby also incorporated by reference in its entirety. The complete disclosure of our U.S. provisional application 62/512,385, filed 30 May 2017 is hereby also incorporated by reference in its entirety. The complete disclosures of all references cited herein are also incorporated by reference in their entirety. In the event of a conflict, the present disclosure shall control over the disclosure of a document incorporated by reference.

What is claimed:

1. A process for producing a hydrophobic insulation blanket, comprising the sequential steps of:
    (a) continuously and in a single pass wetting a dry textile-grade needle felted fiberglass blanket with a thickness from 2.5 mm to 5 cm, with a first dispersion comprising: 80 wt % to 95 wt % of a solvent and a surfactant combined and a 5 to 20 wt % of a hydrophobic fluoropolymer, forming a wet blanket;
    (b) compressing the wet blanket to reach a target wet weight from 50% to 200% greater than the dry textile-grade needle felted fiberglass blanket;
    (c) evaporating 50% to 70% of the first solvent from the wet blanket by microwave or radio frequency while retaining the surfactant, leaving behind the hydrophobic polymer properly distributed throughout the blanket, including its interior to produce a partially-dried blanket having a uniform hydrophobic fluoropolymer dispersion without migrating the fluropolymer to a surface of the wet blanket; and
    (d) forcing heated hot air at a temperature from 400° to 650° Fahrenheit to flow through the partially-dried blanket to remove the remainder of the 30 percent to 50 of the first solvent and increase blanket temperature to thermally decompose residual hydrophilic compounds and remove the surfactant;
    wherein the result is a finished blanket comprising glass fibers and the first fluoropolymer with solvent; wherein the first fluoropolymer with solvent and the glass fibers are interspersed with one another with sufficient uniformity to render the finished blanket as hydrophobic insulation and is temperature stable up to 600° Fahrenheit, and comprises: 60%-95% glass fiber, 2%-30% hydrophobic polymer, and 1%-10% hydrophobic inorganic particles.

2. The process of claim 1, additionally comprising, following said step of forcing heated hot air through the partially dried wet blanket consisting of, the sequential steps of:
    (e) applying to at least one surface of the finished blanket a second dispersion comprising a second solvent, a second fluoropolymer, a second surfactant, an infrared opacifier, a wetting agent, and hydrophobic inorganic particles; wherein the first and second solvents may be the same or different; wherein the first and second fluoropolymers may be the same or different; wherein the first and second surfactants may be the same or different; and wherein the inorganic particles comprise particles selected from the group consisting of silica aerogel, fumed silica, precipitated silica, synthetic amorphous silica, and mixtures thereof; wherein the inorganic particles have a particle size between 0.1 to 100 microns; wherein the inorganic particles have a specific surface area of 100 $m^2/g$ or greater; and wherein the inorganic particles comprise a hydrophobic surface;

(f) heat-drying the second dispersion by conduction, convection, or infrared heating to remove the second solvent and the second surfactant;

wherein a super-hydrophobic topcoat is formed on at least one surface of the finished blanket.

3. The process of claim 1, wherein said wetting step comprises repeatedly dipping and nipping the fiberglass blanket in the dispersion, to achieve a selected degree of wetting.

4. The process of claim 1, wherein the dry textile-grade needle felted fiberglass blanket has a density between 65 to 250 g/L.

5. The process of claim 1; wherein the hydrophobic fluoropolymer is selected from the group consisting of polytetrafluoroethylene, perfluoroalkoxy alkanes, fluorinated ethylene propylene, and mixtures thereof.

6. The process of claim 5; wherein the fluoropolymer comprises polytetrafluoroethylene; and wherein the hydrophobic fluoropolymer is mixed with at least one low-melting fluoropolymer comprising perfluoroalkoxy alkanes, fluorinated ethylene propylene, and mixtures thereof; wherein the at least one low-melting fluoropolymer is between 1% and 90% of the hydrophobic fluoropolymer by mass; wherein the at least one low-melting fluoropolymer and the hydrophobic fluoropolymer are chemically different polymers; and wherein the at least one low-melting fluoropolymer improves the ability to mold the finished blanket into a selected shape that is retained after molding, as compared to an otherwise identical process lacking the at least one low-melting fluoropolymer.

7. The process of claim 6, additionally comprising a step of heat-molding the finished blanket into a selected shape, and then cooling the molded finished blanket so that the selected shape is retained.

8. The process of claim 2, wherein the second fluoropolymer is between 1% and 15% of the second dispersion by mass.

9. The process of claim 2, wherein the hydrophobic inorganic particles are between 0.1% and 5% of the second dispersion by mass.

10. The process of claim 2, wherein the wetting agent is an anionic or nonionic surfactant having a boiling point, a decomposition point, or both below 205° C.; and wherein the wetting agent is between 0.1% and 5.0% of the second dispersion by mass.

11. The process of claim 2, wherein the wetting agent comprises an ether amine oxide, an ethoxylated alcohol, or a mixture thereof.

12. The process of claim 2, wherein said heat-drying step (f) heats the second solvent to a temperature between 205° C. and 345° C.

* * * * *